June 30, 1970     P. G. DUNMIRE     3,517,951

PIPE COUPLING

Original Filed Nov. 22, 1967

INVENTOR.
Paul G. Dunmire
BY *Flehr, Hohbach, Test,*
*Albritton & Herbert*
Attorneys

United States Patent Office 3,517,951
Patented June 30, 1970

3,517,951
PIPE COUPLING
Paul G. Dunmire, Oakland, Calif., assignor to Christy Metal Products Inc., Emeryville, Calif., a corporation of California
Continuation of application Ser. No. 685,160, Nov. 22, 1967. This application Jan. 9, 1969, Ser. No. 791,873
Int. Cl. F16l *17/02, 21/04, 37/00*
U.S. Cl. 285—110                                                3 Claims

ABSTRACT OF THE DISCLOSURE

A pipe coupling for connecting two adjacent aligned ends of pipes having sealing means at each end thereof. The sealing means include a resilient ring of generally circular cross-section and a tapered lip portion which sealingly engages the pipe section. A rigid compression ring having a semi-circular recess is positioned between the resilient ring and a rigid collar. Locking means are provided on the coupling sleeve and the collar for securing the collar on the sleeve.

---

This application is a continuation of application Ser. No. 685,160, filed Nov. 22, 1967, and now abandoned.

BACKGROUND OF THE INVENTION

This invention relates to pipe couplings and in particular to pipe couplings used in water works piping for connecting underground water supply lines.

Heretofore couplings of this general character have generally utilized a coupling sleeve which surrounds the adjacent ends of the pipes to be connected and includes flange means at each end of the sleeve for urging a gasket into engagement about the respective pipe. Such flanges have been commonly pulled up by a plurality of bolts extending the length of the sleeve and between the flanges at each end. As known, materials in tension are subject to greater corrosion rates than unstressed parts and accordingly this type of coupling is subject to frequent corrosion failure. Furthermore, a plurality of bolts have to be tightened uniformly which is time consuming and inconvenient. There is, therefore, a need for a new and improved pipe coupling.

SUMMARY OF THE INVENTION AND OBJECTS

It is the general object of the present invention to provide an improved pipe coupling which will overcome the above named limitations and disadvantages.

Another object of the invention is to provide a pipe coupling of the above character which is particularly simple to manufacture and to assemble and which is positive in achieving sealing engagement with the pipes to be connected.

Another object of the invention is to provide a pipe coupling of the above character which can be simply and readily assembled in single operation and which does not use tensioned bolts.

In general, the above objects are achieved by providing a pipe coupling including an elongate sleeve having cylindrical ends which are positioned about the adjacent ends of the pipe sections to be coupled. The sleeve is somewhat larger than the lateral dimension of the pipe to accommodate any slight misalignment of the pipe sections. Each end of the sleeve is provided with outwardly facing bayonet lugs for gripping and receiving a mating bayonet type locking collar which, when rotated relative to the sleeve, is pulled axially towards it. The inwardly facing wall at each end of the sleeve is relieved and provided with means forming a gasket seat inclined to the end in which a chevron type gasket is positioned and held from axial movement by a compression ring which is engaged by the locking collar as the same is turned up. The action of the locking collar and compression ring in compressing the gasket forces portions of the gasket into engagement with the inclined seat in the sleeve and also tends to open the lip of the chevron gasket and cause it to be urged into sealing engagement with the sidewall of the corresponding pipe.

These and other objects and features of the invention will be apparent from the following description when taken in conjunction with the accompanying drawings.

DESCRIPTION OF THE PREFERRED EMBODIMENT

Figure 1:
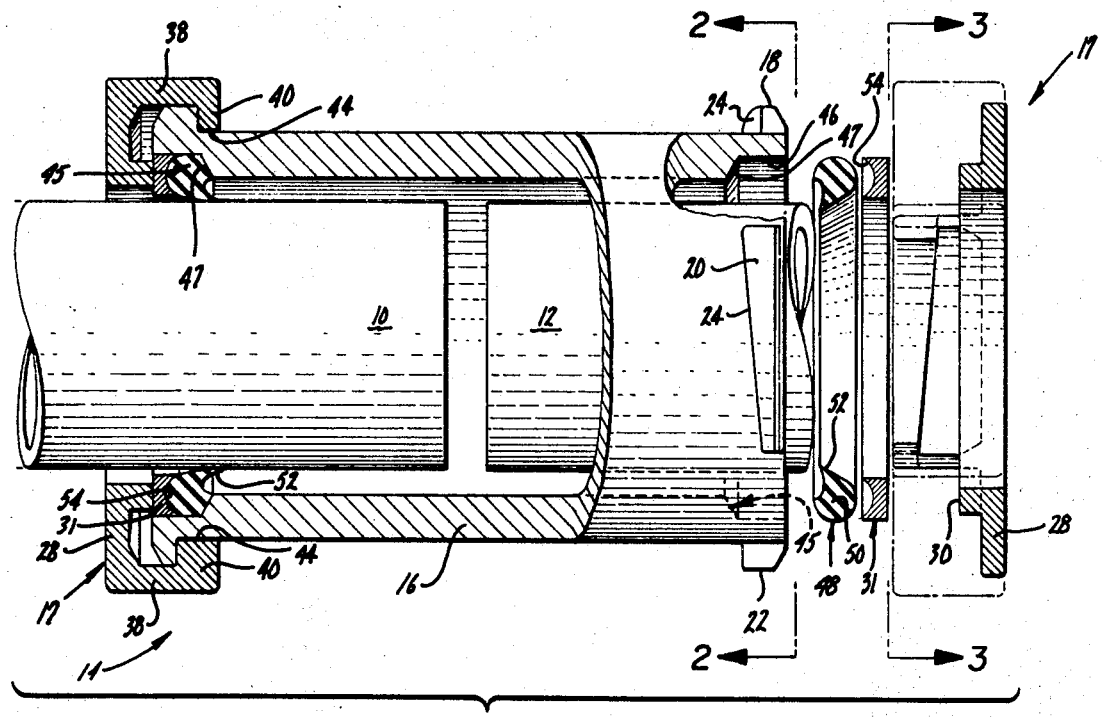
FIG. 1 is a cross-sectional side view with portions broken away, and other portions exploded of a pipe coupling constructed in accordance with the present invention.

Referring to the drawings, there is shown a pair of adjacent ends of pipe sections 10 and 12 which may be separated or slightly misaligned with respect to each other. The pipe coupling 14 of the invention surrounds the region about the space between the pipe sections 10 and 12 and is sealed to their outer walls as hereinafter described.

Pipe coupling 14 includes a body or sleeve 16 having portions which extend along the pipe sections a short distance and which terminate in cylinderical configuration. The sleeve may take any of various forms such as the straight elongate length shows, an elbow, T, or other useful configuration. The end portions of sleeve 16 have somewhat larger inside diameter than the pipe sections to be coupled to that the latter can be slightly misaligned and yet have clearance within the sleeve to be accommodated without binding.

Independent means are provided at each end of the coupling for connecting it into sealed engagement with the outer wall of the enclosed pipe section. Each of such means is identical in construction so that like parts at each end of the coupling will be given like numbers and the description of one will serve as the description of both.

Figure 2:
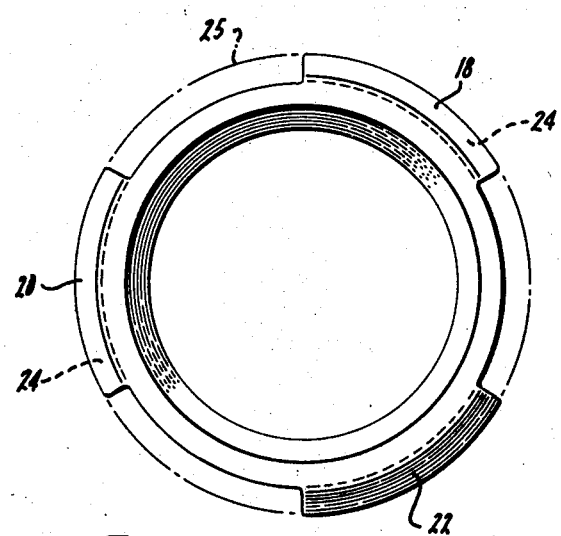
FIG. 2 is an end view of the pipe coupling taken along the lines 2—2 of FIG. 1.

Thus, there is provided a locking collar 17 and means associated with the end of sleeve 16 and the locking collar 17 for progressively moving them into closer relationship as the collar is slipped into engagement and turned upon the sleeve. Such means include three outwardly extending bayonet lugs 18, 20, 22, equally spaced about the circumference at each end of sleeve 16, 14. As shown in FIG. 2, each lug extends radially outwardly and consists of an annular segment which is provided with surfaces 24 facing away from the end of the sleeve and lying in planes which are inclined with respect to the end at equal angles. Additionally, lugs 18, 20, 22 have outwardly facing cylindrical surfaces lying in a common surface as indicated by reference number 25 and adapted to serve as a guide for the rotation of the locking collar 17.

Figure 3:
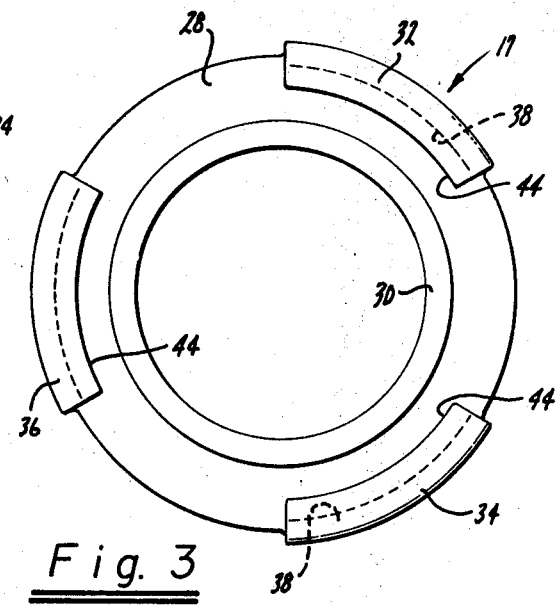
FIG. 3 is an end view of the pipe coupling taken along the lines 3—3 of FIG. 1.

Locking collar 17 is of the bayonet type and is adapted to slip over the end of the sleeve and to engage the lugs. Collar 17 consists of an annular supporting flange 28 and an axially extending inner drive ring 30 for engaging a compression ring 31 and three outwardly extending shoes 32, 34, 36 formed to mate with lugs 18, 20, 22. Thus, as shown in FIGS. 3, the shoes are equally spaced about the outer circumference of the locking collar and consist of annular segments, each of which consists of a portion of cylindrical shell which serves as a web 38 to support the radially inwardly directed section 40 having an axially facing surface 42 which is equally inclined with respect to flange 28 so as to mate with the inclined surface 24 of one of the lugs 18, 20, 22. Sections 40 terminate radially inwardly on an edge 44 having approximately the curvature of the respective pipe section. Thus, as the locking collar is assembled to the end of the pipe, the mating inclined surfaces 24, 42 engage each other as the collar is turned and serve thereby to pull the collar inwardly toward the sleeve end 14 as it is rotated. When the collar is assembled, alignment is first established by the controlled clearance between inwardly facing edge 44 of each of the shoes and the outer surface at the end of the sleeve.

An annular recess 45 is formed at each end of the sleeve and is defined by a cylindrical sidewall 46 beginning at the end of the sleeve and extending axially thereof. Means forming a seat 47 for a gasket 48 is positioned at the end of the recess and closes it. Seat 47 is inclined inwardly from the cylindrical wall and has a generally frustoconical shape.

The gasket is made of a suitable resilient material such as neoprene and is formed in a chevron configuration in cross section, with a generally solid body 50 to which is connected a radially inwardly depending lip 52 adapted to contact the outer wall of the pipe. The gasket is so oriented that it opens away from the end sleeve 16. Compression ring 31 has an annular recess 54 formed therein on that side away from collar 17 for receiving and centering the body of gasket 48, the ring having an outer diameter for sliding fit into the recess together with the gasket. In this way the compression of the gasket 48 against seat 47 by the compression ring causes the gasket to be centered and to be forced open into sealing contact, the body of the gasket being forced into contact with seat 47 and the lip being force radially inwardly into engagement with the outer wall of the pipe. Fluid pressure inside the sleeve will cause the gasket lip to open thereby increasing the sealing force with which it engages the pipe.

Assembly of the pipe coupling consists of moving one section of pipe and slipping, in turn, the locking collar 17, compression ring 31, chevron gasket 48, and sleeve 16 over that section of pipe. The other locking collar, compression ring, and gasket are then passed over the end of the remaining section of pipe, the pipe sections and sleeve are then brought into the desired position with respect to each other. The gaskets are slid into their respective seats, compression rings positioned and bayonet locking collars pulled in so that the shoes 32, 34, 36 partially engage the lugs 18, 20, 22. Thereafter, the collars are tightened by turning them in any convenient manner, such as by striking or engaging the projecting edges of the shoes 32, 34, 36.

Thus, there has been described a new and improved pipe coupling which is particularly simple and effective to assembly and manufacture and which does not rely on highly tensioned and elongate bolts. The pipe coupling of the present invention is particularly strong and is adapted for long service without being subject to failure from tension enhanced corrosion.

I claim:
1. In a pipe coupling for forming a connection between two adjacent aligned ends of two separate sections of pipe, a sleeve having an inner diameter on each end substantially greater than the outer diameter of the end of the pipe section to be positioned therein, each end of said sleeve having an outwardly facing annular recess formed therein to provide a seat, annular resilient sealing means disposed in the seat in each end of the sleeve, said resilient sealing means including an annular body portion which is generally circular in cross-section and a flexible tapered lip portion integral with said body portion, said lip portions extending inwardly in a radial direction a substantial distance beyond the inner diameter of the sleeve and also extending inwardly in an axial direction of the sleeve to lie upon the outer diameter of the pipe section to be positioned therein, a rigid compression ring provided for each end of the sleeve and engaging the resilient sealing means, each compression ring having an annular recess which is generally semi-circular in cross-section and that is adapted to receive and engage the associated resilient sealing means, a rigid collar for each end of the sleeve and engaging the compression ring and cooperative locking means carried by each collar and the associated end of the sleeve for locking the collar on the sleeve and for moving the collar inwardly of the sleeve in an axial direction as the collar is rotated on the sleeve whereby the compression ring is urged inwardly in an axial direction to compress the resilient sealing means against the seat, said sleeve being formed so that there is an annular space extending axially of the sleeve from the end of the pipe section to the resilient sealing means so that the pressure of a fluid carried by the pipe sections is applied directly to the lip portion of the sealing means to increase the sealing engagement of the lip portion with the pipe section.

2. A pipe coupling as in claim 1 wherein said annular recess is formed by a cylindrical wall having its axis substantially coincident with the axis of the sleeve and an annular wall extending inwardly in a radial direction and being tapered in an axial direction.

3. A pipe coupling as in claim 1 wherein said cooperative locking means in in the form of a bayonet type coupling.

References Cited

UNITED STATES PATENTS

| 3,430,990 | 3/1969 | Nelson | 285—348 X |
| 1,202,196 | 10/1916 | Lewis | 285—356 X |
| 1,965,915 | 7/1934 | Wilson. | |
| 2,670,222 | 2/1954 | Dragon | 285—111 X |

FOREIGN PATENTS

| 409,710 | 2/1945 | Italy. |
| 416,809 | 9/1934 | Great Britain. |
| 688,758 | 3/1953 | Great Britain. |

THOMAS F. CALLAGHAN, Primary Examiner

U.S. Cl. X.R.

285—362, 369, 348, 231